United States Patent
Liu

(10) Patent No.: US 12,223,725 B2
(45) Date of Patent: Feb. 11, 2025

(54) OBJECT IDENTIFICATION METHOD AND RELATED SURVEILLANCE SYSTEM

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 636 days.

(21) Appl. No.: 17/537,390

(22) Filed: Nov. 29, 2021

(65) Prior Publication Data
US 2022/0189176 A1    Jun. 16, 2022

(30) Foreign Application Priority Data
Dec. 10, 2020    (TW) .................................. 109143604

(51) Int. Cl.
*G06V 20/52*    (2022.01)
*G06V 10/74*    (2022.01)
*G06V 10/762*    (2022.01)
*G06V 40/20*    (2022.01)

(52) U.S. Cl.
CPC ............ *G06V 20/52* (2022.01); *G06V 10/761* (2022.01); *G06V 10/762* (2022.01); *G06V 40/23* (2022.01)

(58) Field of Classification Search
CPC .... G06V 20/52; G06V 10/761; G06V 10/762; G06V 40/23; G06V 10/772; G06V 10/774; G06V 40/20
See application file for complete search history.

(56) References Cited

U.S. PATENT DOCUMENTS

| | | | |
|---|---|---|---|
| 10,002,296 B2 * | 6/2018 | Wang | G06V 20/46 |
| 10,803,604 B1 * | 10/2020 | Gui | G06T 7/215 |
| 11,763,525 B1 * | 9/2023 | Jotwani | G06V 10/46 345/419 |
| 12,045,270 B2 * | 7/2024 | Ferreira Lima | G06N 5/02 |
| 2012/0294511 A1 * | 11/2012 | Datta | G06T 7/251 382/155 |
| 2014/0003708 A1 * | 1/2014 | Datta | G06V 20/52 382/159 |
| 2014/0055610 A1 * | 2/2014 | Ko | G06T 7/194 348/143 |

(Continued)

FOREIGN PATENT DOCUMENTS

CN    103985114 A    8/2014
CN    110929770 A    3/2020

*Primary Examiner* — Mia M Thomas
(74) *Attorney, Agent, or Firm* — Winston Hsu

(57) ABSTRACT

An object identification method is applied to a surveillance system. The surveillance system includes at least one surveillance apparatus. The object identification method includes acquiring a plurality of first feature vectors of a first moving object and a plurality of second feature vectors of at least one second moving object within a series of surveillance images from the surveillance apparatus, transforming the first feature vectors and the second feature vectors respectively into a first cluster distribution set and at least one second cluster distribution set, comparing similarity of the first cluster distribution set and the at least one second cluster distribution set, and setting a similarity ranking of the first cluster distribution set and the at least one second cluster distribution set according to a comparison result so as to determine whether the first moving object and the at least one second moving object are the same.

16 Claims, 9 Drawing Sheets

(56) References Cited

U.S. PATENT DOCUMENTS

| | | | |
|---|---|---|---|
| 2015/0019554 A1* | 1/2015 | Hall | G06F 18/23211 |
| | | | 707/737 |
| 2016/0171096 A1* | 6/2016 | Seow | G06F 18/23 |
| | | | 707/738 |
| 2017/0024899 A1* | 1/2017 | Hammoud | G06V 10/758 |
| 2017/0178345 A1* | 6/2017 | Pham | G06V 10/56 |
| 2017/0261264 A1* | 9/2017 | Wang | G06V 20/41 |
| 2017/0330454 A1* | 11/2017 | Bäckvall | G06T 7/285 |
| 2018/0089534 A1* | 3/2018 | Ye | G06V 40/173 |
| 2018/0144186 A1* | 5/2018 | Wnuk | G06F 16/7837 |
| 2018/0286081 A1* | 10/2018 | Koperski | G06V 20/52 |
| 2019/0057518 A1* | 2/2019 | Liu | G06V 20/53 |
| 2019/0130583 A1* | 5/2019 | Chen | G06T 7/194 |
| 2019/0146991 A1* | 5/2019 | Sato | G06V 40/103 |
| | | | 382/224 |
| 2019/0171905 A1* | 6/2019 | Ye | G06V 40/161 |
| 2020/0012849 A1* | 1/2020 | Zhang | G06V 40/103 |
| 2020/0110764 A1* | 4/2020 | Pollak | G06F 18/23213 |

\* cited by examiner

OBJECT IDENTIFICATION METHOD AND RELATED SURVEILLANCE SYSTEM

BACKGROUND OF THE INVENTION

1. Field of the Invention

The present invention relates to an object identification method and a surveillance system, and more particularly, to an object identification method and a surveillance system capable of effectively speeding data searching efficiency.

2. Description of the Prior Art

A conventional surveillance system can utilize one camera to record a video of a surveillance region, or can drive a plurality of cameras to respectively record several videos of a plurality of surveillance regions. When a specific object, such as a thief, is found in a time period of the video, all the video has to be played and inspected frame by frame manually to identify whether the specific object is appeared in other time period of the video or appeared in other videos. Visual inspection of the video wastes time and does not conform to an actual demand; even if the video is inspected by image identification technique, an operation period of the image identification technique still needs lots of time. Therefore, design of an object identification method and a surveillance system capable of increasing identification speed is an important issued in the surveillance industry.

SUMMARY OF THE INVENTION

The present invention provides an object identification method and a surveillance system capable of effectively speeding data searching efficiency for solving above drawbacks.

According to the claimed invention, an object identification method is applied to a surveillance system, and the surveillance system has at least one surveillance apparatus. The object identification method includes acquiring a plurality of first feature vectors of a first moving object and a plurality of second feature vectors of at least one second moving object within a series of surveillance images from the surveillance apparatus, transforming the plurality of first feature vectors into a first cluster distribution set, transforming the plurality of second feature vectors into at least one second cluster distribution set, applying a main similarity comparison to the first cluster distribution set and the at least one second cluster distribution set, and setting a similarity ranking of the at least one second cluster distribution set relative to the first cluster distribution set in accordance with a main comparison result, so as to determine whether the first moving object and the at least one second moving object are the same.

According to the claimed invention, a surveillance system includes at least one surveillance apparatus and an operation processor. The at least one surveillance apparatus is adapted to acquire a series of surveillance images. The operation processor is electrically connected to the at least one surveillance apparatus in a wire manner or in a wireless manner. The operation processor is adapted to acquire a plurality of first feature vectors of a first moving object and a plurality of second feature vectors of at least one second moving object within the series of surveillance images, to transform the plurality of first feature vectors into a first cluster distribution set, to transform the plurality of second feature vectors into at least one second cluster distribution set, to apply a main similarity comparison to the first cluster distribution set and the at least one second cluster distribution set, and set a similarity ranking of the at least one second cluster distribution set relative to the first cluster distribution set in accordance with a main comparison result, so as to determine whether the first moving object and the at least one second moving object are the same.

The object identification method and the surveillance system of the present invention can search several surveillance images that contain each moving object from the video data via the trace data of the moving objects, and find out the feature vectors of the moving object in each surveillance image for generating the cluster distribution set of the moving object. Each of the moving objects in the video data can have the corresponding cluster distribution set. If the surveillance system intends to confirm whether one moving object is appeared in other surveillance period of the video data (which means the surveillance system includes one camera) or appeared in other surveillance regions (which means the surveillance system includes the plurality of cameras), the object identification method can analyze the appearing time interval, the cluster center and the indication point of time of the cluster distribution set of the moving object to compare with the appearing time interval, the cluster center and the indication point of time of other cluster distribution sets, so as to rapidly find out all information related to the moving object from the video data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
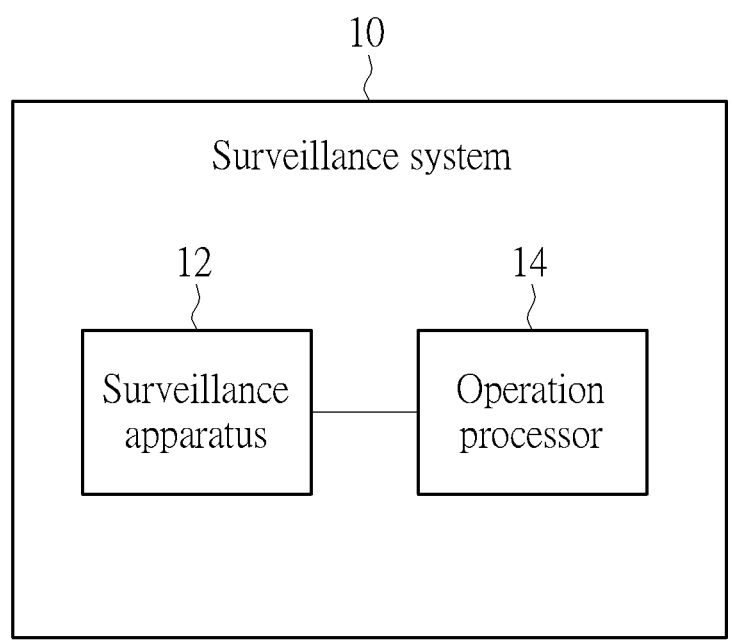
FIG. 1 is a functional block diagram of a surveillance system according to an embodiment of the present invention.
Figure 2:
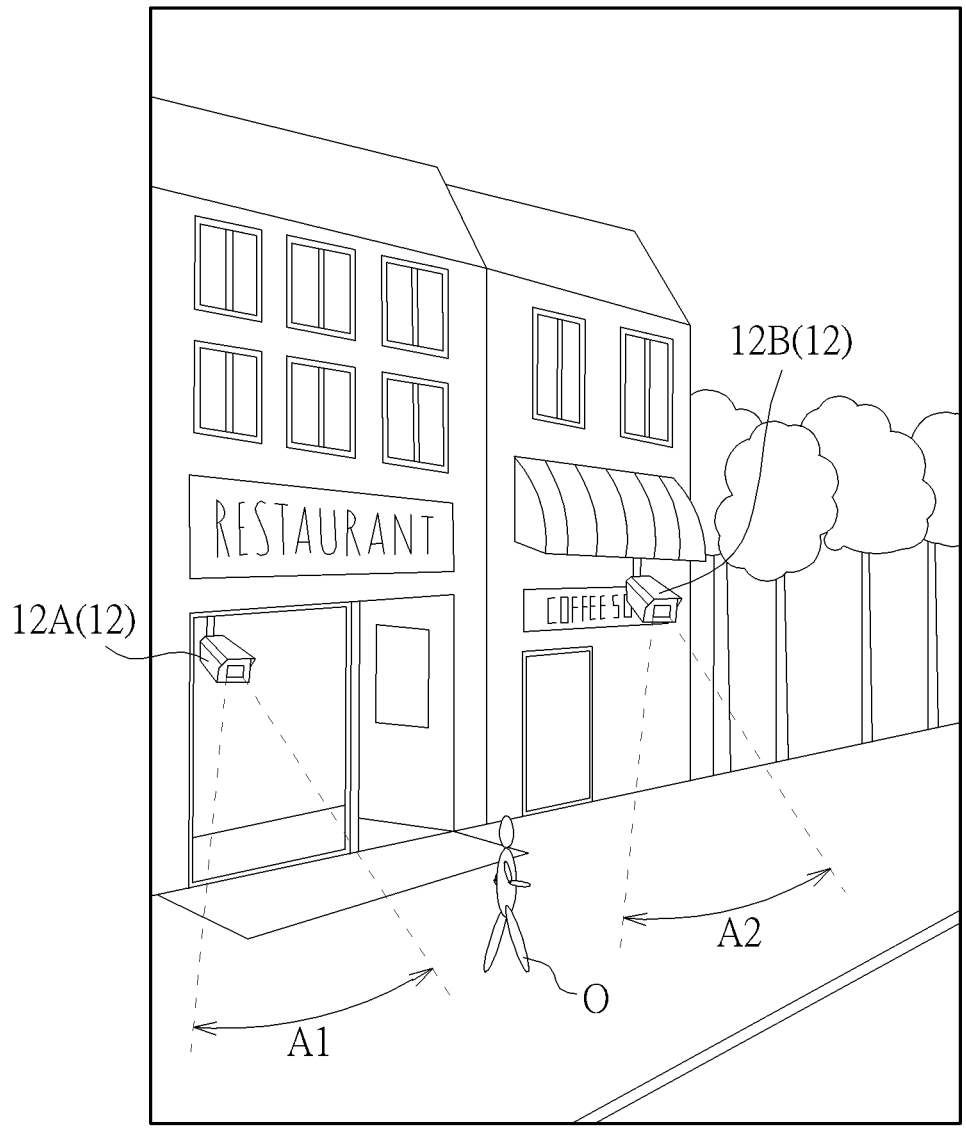
FIG. 2 is a diagram of the surveillance system according to the embodiment of the present invention.

Please refer to FIG. 1 and FIG. 2. FIG. 1 is a functional block diagram of a surveillance system 10 according to an embodiment of the present invention. FIG. 2 is a diagram of the surveillance system 10 according to the embodiment of the present invention. The surveillance system 10 can include a surveillance apparatus 12 and an operation processor 14 electrically connected to each other in a wire manner or in a wireless manner. The surveillance apparatus 12 can be one or several cameras. A series of surveillance images acquired by the camera 12A can be a video datum of a surveillance region A1 in a period. Another series of surveillance images respectively acquired by the cameras 12A and 12B can respectively be video data of the surveillance regions A1 and A2 in the same period or in different periods. The operation processor 14 can analyze the series of surveillance images acquired by the camera 12A to determine whether a specific moving object is repeatedly appeared within the surveillance region A1, or analyze the series of surveillance images acquired by the cameras 12A and 12A to determine whether the specific moving object is repeatedly appeared within the surveillance regions A1 and A2.

Figure 9:
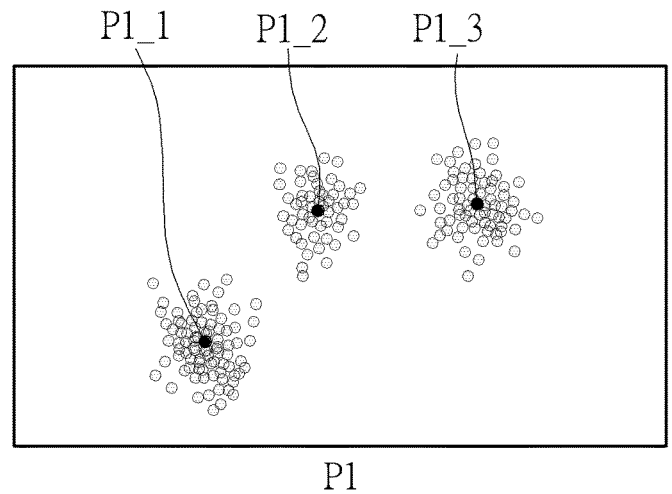
FIG. 9 to FIG. 11 are diagrams of cluster distribution sets transformed from feature vectors of the moving object within the series of surveillance images according to the embodiment of the present invention.
Figure 10:
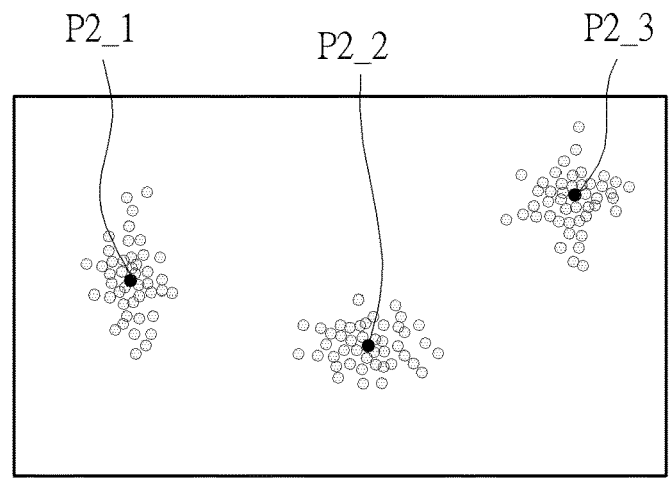
Figure 11:
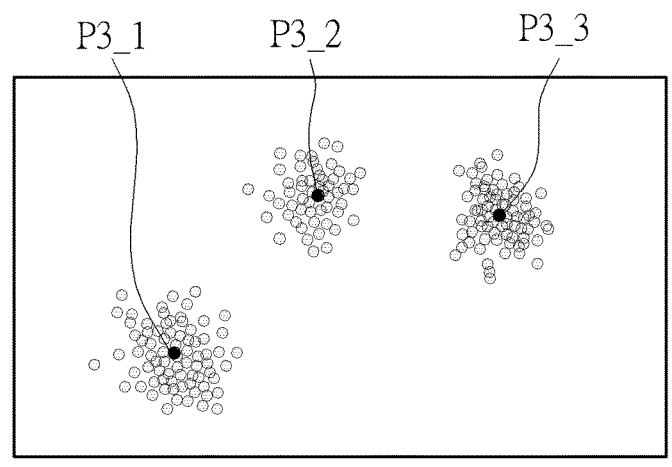
Figure 12:
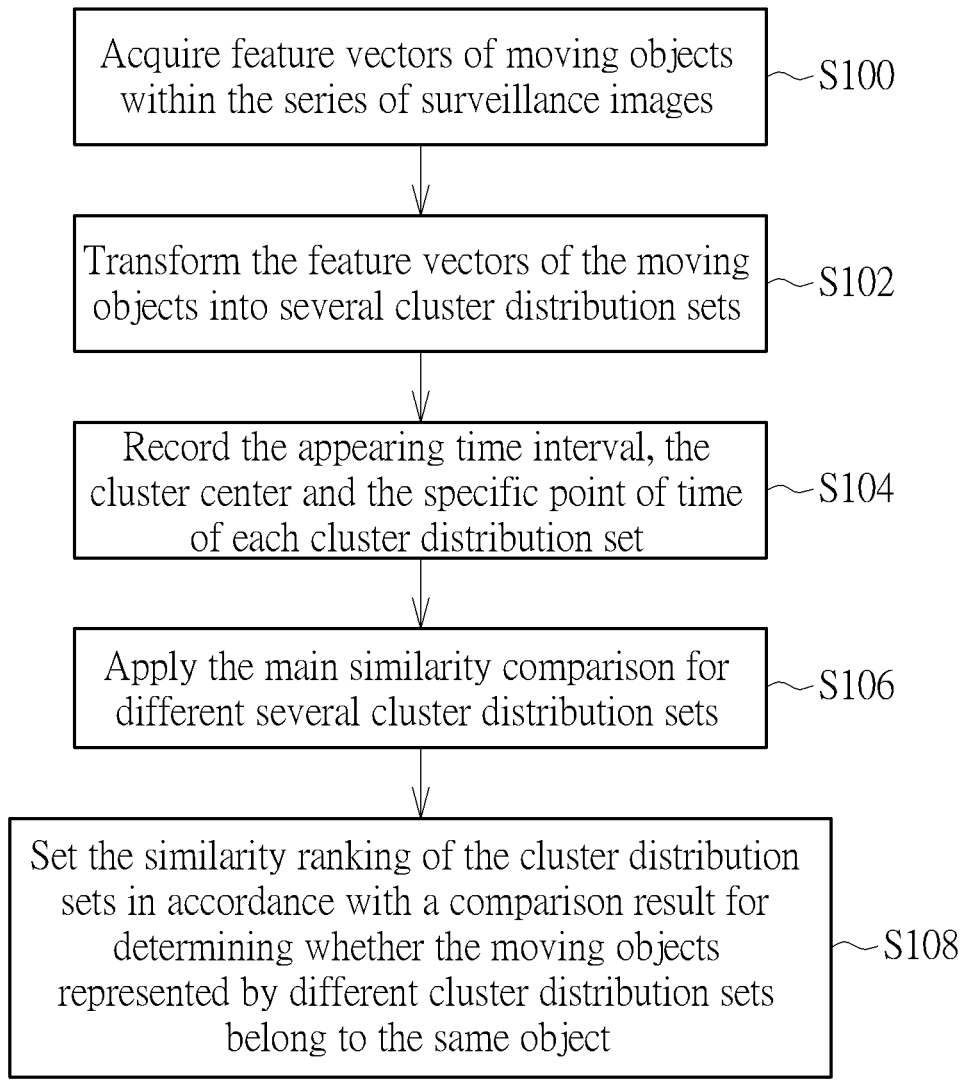
FIG. 12 is a flow chart of an object identification method according to the embodiment of the present invention.

Please refer to FIG. 3 to FIG. 12. FIG. 3 to FIG. 8 are diagrams of the series of surveillance images I acquired by the surveillance system 10 according to the embodiment of the present invention. FIG. 9 to FIG. 11 are diagrams of cluster distribution sets transformed from feature vectors of the moving object O within the series of surveillance images I according to the embodiment of the present invention. FIG. 12 is a flow chart of an object identification method according to the embodiment of the present invention. The object identification method illustrated in FIG. 12 can be suitable for the surveillance system 10 shown in FIG. 1. First, step S100 can be executed to acquire a plurality of feature vectors of all the moving objects O within the series of surveillance images I. For example, the series of surveillance image I may have hundreds of images, and there are six surveillance images I containing the moving object O. The surveillance image I shown in FIG. 3 and FIG. 4 may capture the front side of a first moving object O1 turning to the left, and the surveillance image I shown in FIG. 5 and FIG. 6 may capture the back side of a second moving object O2, and then the surveillance image I shown in FIG. 7 and FIG. 8 can capture the front side of a third moving object O3 turning to the right side; other surveillance images I may capture the road without any moving object, and can be omitted herein for simplicity.

As an example of the first moving object O1, the surveillance system 10 can analyze the series of surveillance images I to acquire trace data of the first moving object O1. Then, some surveillance images I, which corresponds to the trace data, can be found out from the series of surveillance image I; that is to say, the surveillance images I that contain the first moving object O1 can be searched, such as the front side of the first moving object O1 turning to the left being captured by the surveillance image I shown in FIG. 3 and FIG. 4. Final, the surveillance system 10 can analyze the surveillance images I that contain the first moving object O1 to acquire a plurality of first feature vectors. A plurality of second feature vectors of the second moving object O2 and a plurality of third feature vectors of the third moving object O3 can be acquired in the same manner, and a detailed description is omitted herein. Numbers of the first feature vector, the second feature vector and the third feature vector may be the same or different from each other, which depend on an actual demand.

When the first moving object O1 is marched, the surveillance system 10 may capture some variant situations of the first moving object O1, such as gesture change of the human body, angle change of the human body relative to the surveillance apparatus 12, change of appliances carried or shouldered by the human body. Each variant situation of the first moving object O1 within the surveillance image I can be transformed into the first feature vector. Generally, each surveillance image I that contains the first moving object O1 can provide one first feature vector; however, a number of the first feature vector in one surveillance image I is not limited to the above-mentioned embodiment. The surveillance image I that contains the first moving object O1 may be divided into several areas, and each area can individually provide a sub-level feature vector, and the sub-level feature vectors of the several areas can be combined to set as the first feature vector of the surveillance image I.

Figure 3:
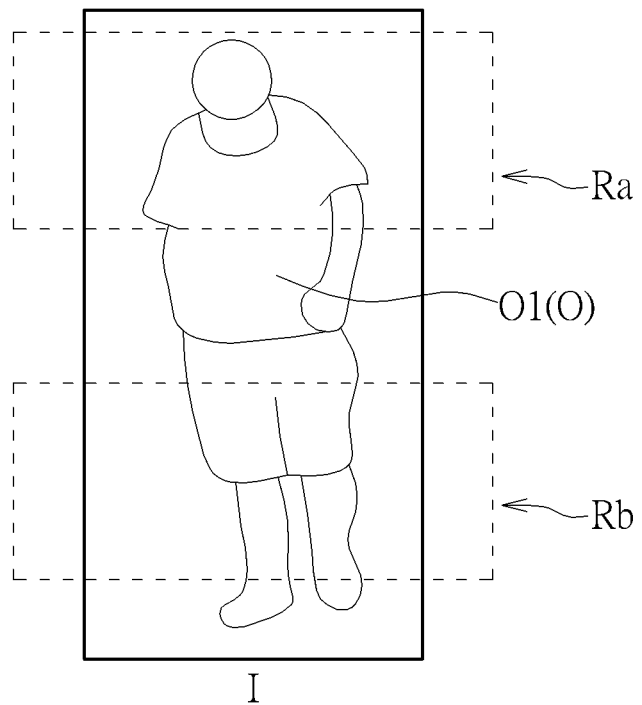
FIG. 3 to FIG. 8 are diagrams of the series of surveillance images acquired by the surveillance system 10 according to the embodiment of the present invention.
Figure 4:
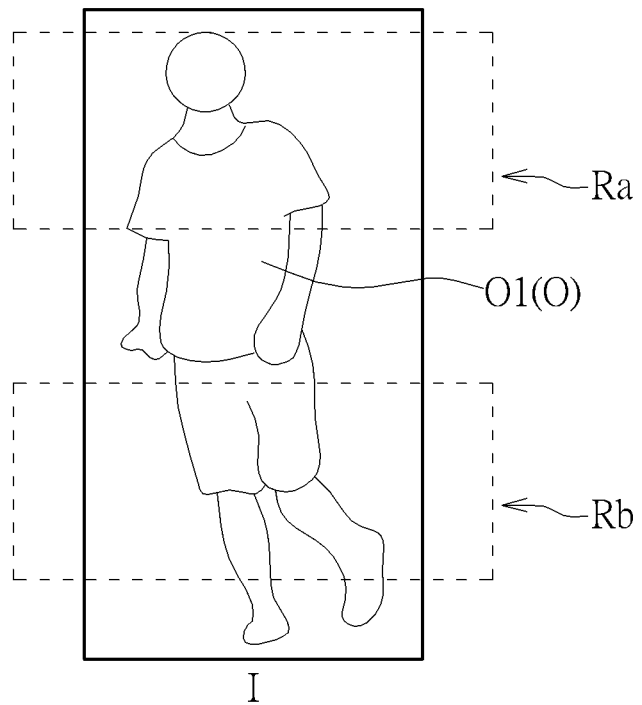
Figure 5:
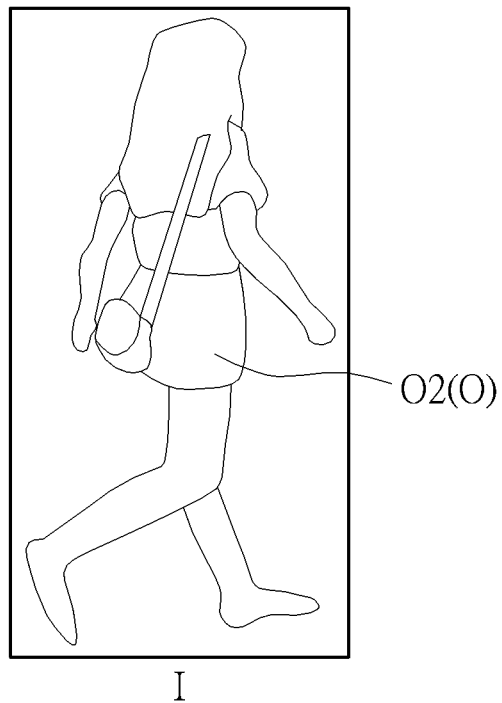
Figure 6:
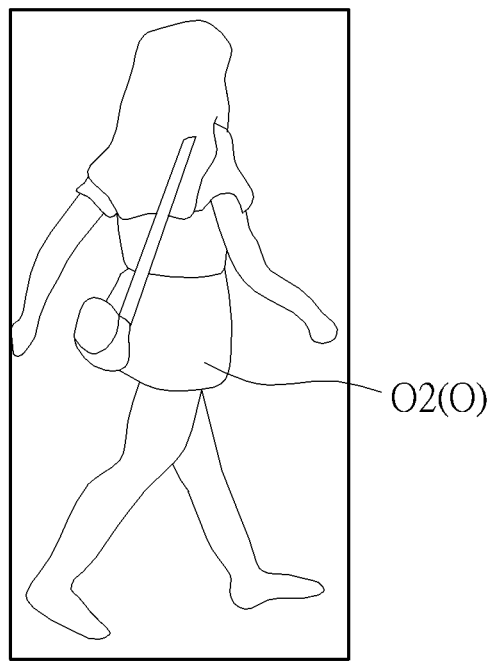
Figure 7:
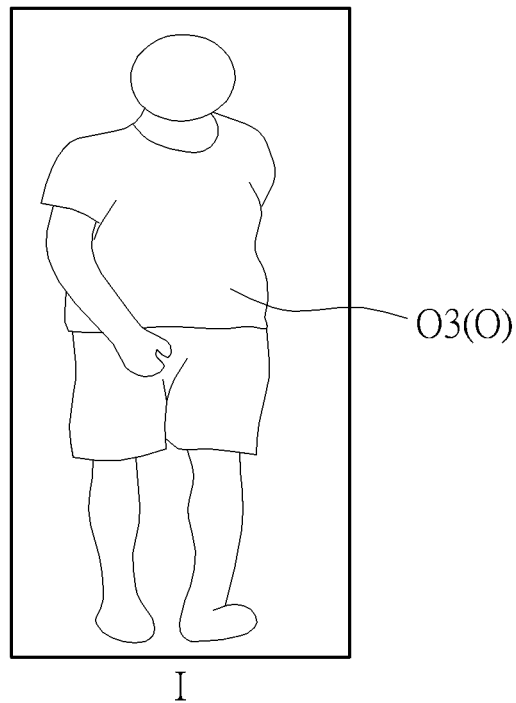
Figure 8:
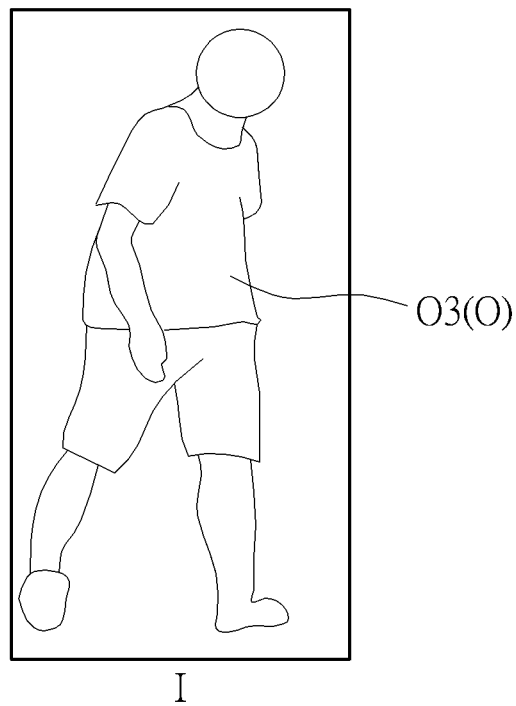

In other possible embodiments, the surveillance system 10 can divide the surveillance image I at least into an alpha area Ra and a beta area Rb in accordance with a size and position of the first moving object O1 within the series of surveillance images I, such as the alpha area Ra relevant to the head and the beta area Rb relevant to the foot shown in FIG. 3. Then, the surveillance system 10 can compute a first alpha area sub-feature vector of the first moving object O1 in the alpha area Ra and a first beta area sub-feature vector of the first moving object O1 in the beta area Rb within the surveillance image I relevant to the trace data of the first moving object O1; finally, the first alpha area sub-feature vector and the first beta area sub-feature vector can be combined to set as the first feature vector relevant to the surveillance image I. Therefore, the first alpha area sub-feature vector and the first beta area sub-feature vector in FIG. 3 can be combined and set as the first feature vector of the surveillance image I shown in FIG. 3, and the first alpha area sub-feature vector and the first beta area sub-feature vector in FIG. 4 can be combined and set as the first feature vector of the surveillance image I shown in FIG. 4.

A number and position of areas in each surveillance image I are not limited to the embodiment, and depend on a design demand. The surveillance system 10 may preset an area that has a preferred degree of identification within the surveillance image I; for example, the head of the moving object can be defined as the alpha area Ra, and the foot of the moving object can be defined as the beta area Rb. Besides, the surveillance system 10 may uniformly divide the surveillance image I, and an upper part of the surveillance image I can be defined as the alpha area Ra and a lower part of the surveillance image I can be defined as the beta area Rb. Further, the surveillance system 10 may set a region of interest in a specific part of the surveillance image I; for example, the region of interest can be set on the face of the moving object within the surveillance image I to define as the alpha area Ra, and other part of the surveillance image I, excluding the face of the moving object, can be defined as the beta area Rb.

Then, step S102 can be executed to transform the feature vectors of each moving object into a cluster distribution set. For example, the plurality of first feature vectors of the first moving object O1 can be transformed into a first cluster distribution set P1, as shown in FIG. 9; the plurality of second feature vectors of the second moving object O2 can be transformed into a second cluster distribution set P2, as shown in FIG. 10; the plurality of third feature vectors of the third moving object O3 can be transformed into a third cluster distribution set P3, as shown in FIG. 11. In the present invention, each point of the cluster distribution set can represent one feature vector of the moving object, and therefore all specific variant situations of each moving object can correspond to cluster distribution difference in the feature vector.

In step S102, the object identification method can preset a population number; for example, the population number in FIG. 9 to FIG. 11 can be three. Then, the plurality of first feature vectors (or the second feature vectors or the third feature vectors) can be divided into three clusters via the preset population number for forming the first cluster distribution set P1 (or the second cluster distribution set P2 or the third cluster distribution set P3). Generally, the preset population number is an invariable number, which means a number of the clusters in each cluster distribution set can be divided in accordance with the preset population number. In addition, the object identification method may optionally adjust the population number in accordance with similarity between the plurality of feature vectors, so as to provide an accurate degree of identification. For example, if the plurality of feature vectors is divided into three clusters (which may respectively correspond to the variant situations of a front side, a back side and a lateral side of the moving object O) via the preset population number, two of the clusters may have highly similarity; in this condition, the surveillance system 10 may only capture two variant situations (such as the back side and the lateral side) of the moving object O, so that the population number of the cluster distribution set can be adjusted as two. If all the three clusters have low similarity and one of the clusters has scattered distribution, the surveillance system 10 may capture a specific behavior (such as wearing a hat or a jacket, or taking an umbrella) of the moving object O, and a number of the variant situations can be increased due to appearance change of the moving object O, so that the population number of the cluster distribution set can be adjusted as four.

Then, step S104 can be executed to record an appearing time interval and a cluster center of each cluster distribution set and a specific point of time representing the cluster distribution set. As mentioned above, the surveillance system 10 can search several surveillance images I which contains the moving object O from the series of surveillance images I in accordance with the trace data of the moving object, and analyze those surveillance images I that contains the moving object O to acquire the feature vector and the cluster distribution set, so that each cluster distribution set can be appeared in a part of time period of the series of surveillance images I. For example, a person may be identified as the first moving object O1 when walking into a restaurant in early time, and further be identified as the third moving object O3 when leaving the restaurant in later, so that the first appearing time interval of the first cluster distribution set P1 may be ranged between 8:00 a.m. to 9:00 a.m., and the third appearing time interval of the third cluster distribution set P3 may be ranged between 10:00 a.m. to 11:00 a.m.

Then, the first cluster center of each cluster of the first cluster distribution set P1 can be a geometric center (such as points P1_1, P1_2 and P1_3 shown in FIG. 9) of all the first feature vectors in each cluster, and the first specific point of time of the first cluster distribution set P1 can be an acquired time of the first feature vector closest to the first cluster center. For example, if the first appearing time interval of one cluster in the first cluster distribution set P1 can be ranged between a period of t1~tn, the points of time t1~tn can respectively correspond to the first feature vectors v1~vn; the first feature vectors v1~vn can be used to define the first cluster center vc of one cluster, which has the specific point of time equal to tc, and $t1 \leq tc \leq tn$. In the meantime, one of the first feature vectors v1~vn which is closest to the cluster center vc can be defined as the first feature vector vm, and a point of the time for the first feature vector vm can be defined as the first specific point of time. The surveillance image I acquired at the point of time tm can be an indication image of the first cluster distribution set P1.

The present invention can acquire the appearing time interval, the cluster center and the specific point of time of the second cluster distribution set P2 and the third cluster distribution set P3, which may be similar to manners of the first cluster distribution set P1, and a detailed description is omitted herein for simplicity.

In the present invention, the surveillance system 10 can continuously gather and store the series of surveillance image I (or the video data) of the surveillance regions A1 and A2 of the cameras 12A and/or 12B, and find out some data relevant to the moving object from the video data in accordance with the cluster distribution feature of the moving object. First, if intending to find the video data related to the first moving object O1 in the appearing time interval Ta to Tb, several cluster distribution sets that represent different moving object appeared at the specific point of time tc within the appearing time interval Ta to Tb can be directly selected. Then, steps S106 and S108 can be executed to apply a main similarity comparison for the said several cluster distribution sets and the first cluster distribution set P1, and set a similarity ranking of the said several cluster distribution sets, so as to determine whether the moving objects represented by different cluster distribution sets belong to the same object. Similarity between different clusters can be decided by feature variability of the clusters, and can be determined via the cosine similarity algorithm in accordance with centers of each cluster, or can be determined via a distance between adjacent clusters acquired by the Euclidean distance algorithm. Cluster similarity analysis method of the cluster distribution sets is not limited to the above-mentioned mathematic models, which depends on the actual demand, and a detailed description of other possible mathematic models is omitted herein for simplicity.

Figure 15:
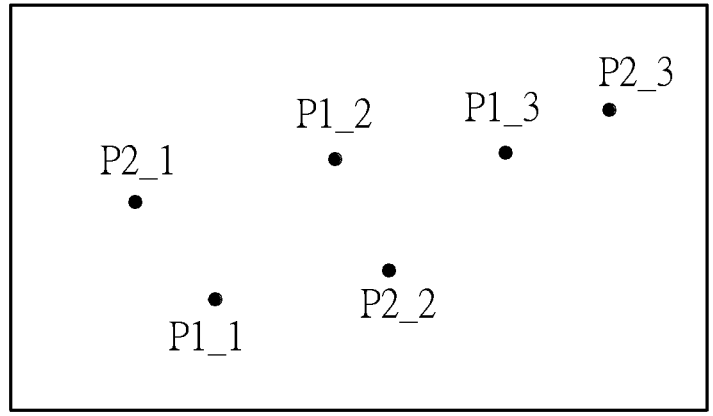
FIG. 15 is a diagram of the first cluster distribution set in FIG. 9 overlapped with the second cluster distribution set in FIG. 10.
Figure 16:
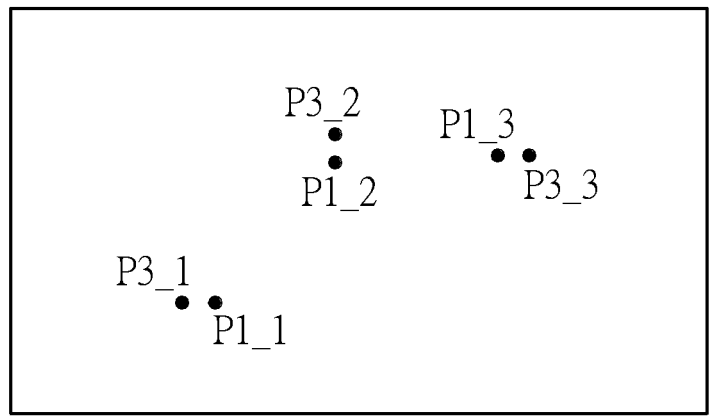
FIG. 16 is a diagram of the first cluster distribution set in FIG. 9 overlapped with the third cluster distribution set in FIG. 11.

Please refer to FIG. 15 and FIG. 16. FIG. 15 is a diagram of the first cluster distribution set P1 in FIG. 9 overlapped with the second cluster distribution set P2 in FIG. 10. FIG. 16 is a diagram of the first cluster distribution set P1 in FIG. 9 overlapped with the third cluster distribution set P3 in FIG. 11. In one embodiment of the present invention, the first cluster distribution set P1 can have three cluster centers P1_1, P1_2 and P1_3, and the second cluster distribution set P2 can have three cluster centers P2_1, P2_2 and P2_3, and the third cluster distribution set P3 can have three cluster centers P3_1, P3_2 and P3_3. For determining the similarity between the cluster distribution sets, nine distances individually between the cluster centers P1_1, P1_2 and P1_3 and the cluster centers P2_1, P2_2 and P2_3 can be computed for a start, and a shortest distance from the foresaid nine distances can be set as a second cluster distribution distance of the second cluster distribution set P2 compared with the first cluster distribution set P1; further, nine distances individually between the cluster centers P1_1, P1_2 and P1_3 and the cluster centers P3_1, P3_2 and P3_3 can be computed, and a shortest distance from the foresaid nine distances can be set as a third cluster distribution distance of the third cluster distribution set P3 compared with the first cluster distribution set P1. If the third cluster distribution distance is smaller than the second cluster distribution distance, the similarity ranking of the third cluster distribution set P3 can be higher than the similarity ranking of the second cluster distribution set P2.

As mentioned above, the cluster center can be the geometric center or a gravity center of each cluster. The number of the cluster center in each cluster distribution set can be similar to or different from each other. The number of the cluster center in the cluster distribution set is not limited to the foresaid embodiment, and depends on the actual demand. Thus, if the shortest distance between each cluster center of the reference cluster distribution set and each cluster center of one cluster distribution set is smaller than the shortest distance between each cluster center of the reference cluster distribution set and each cluster center of another cluster distribution set, the similarity ranking of the previously said cluster distribution set can be higher than the similarity ranking of the another cluster distribution set. Analysis of the similarity ranking may be acquired by other possible algorithms, and a detailed description is omitted herein for simplicity.

As shown in FIG. 9 to FIG. 11, the third cluster distribution set P3 may have the greater similarity ranking via analysis of the similarity ranking, and the first moving object O1 and the third moving object O3 can be determined as being the same object; in the meantime, the surveillance image I (such as the image shown in FIG. 3 or FIG. 4) of the first cluster distribution set P1 acquired at the specific point of time tm and the indication image (such as the image shown in FIG. 7 or FIG. 8) of the third cluster distribution set P3 acquired at the specific point of time can be displayed on a screen of the surveillance system 10, and the first moving object O1 and the third moving object O3 can be the same person that captured by different gestures. The similarity ranking of the second cluster distribution set P2 may be lower than the similarity ranking of the third cluster distribution set P3; the indication image (such as the image shown in FIG. 5 or FIG. 6) of the second cluster distribution set P2 acquired at the specific point of time can be further displayed on the screen of the surveillance system 10, and the second moving object O2 can be the person having long hairs and dressed a skirt and carrying a backpack, so that the second moving object O2 can be determined as being different from the first moving object O1 and the third moving object O3.

In some possible embodiments, the surveillance system 10 may capture an extra object other than the moving objects O1, O2 and O3, and the moving object and the cluster distribution set representing the extra object can be further compared with the first cluster distribution set P1, and therefore all the moving objects appeared in the series of surveillance image I can be applied for the similarity ranking in accordance with the actual demand.

In a particular situation, the variant situation between the first moving object O1 and the second moving object O2 is unobvious, and the object identification method of the present invention can adjust identification process accordingly to increase identification accuracy. For example, if the first moving object O1 can be the passenger with short hairs and dressed a pant without the backpack, and the second moving object O2 is changed as having the long hairs and dressed in the pant without the backpack, the similarity between the first cluster distribution set P1 and the second cluster distribution set P2 is high; meanwhile, the object identification method can set the region of interest on a middle of the surveillance image I as being the alpha area Ra (which can refer to foresaid description and FIG. 3), and transform the plurality of first alpha area sub-feature vectors of the first moving object O1 within the alpha area Ra into a first alpha area cluster distribution set (not shown in the figures), and further transform the plurality of second alpha area sub-feature vectors of the second moving object O2 within the alpha area Ra into a second alpha area cluster distribution set (not shown in the figures). The first alpha area cluster distribution set and the second alpha area cluster distribution set can be applied by sub similarity comparison via theory of steps S106 and S108, and the similarity ranking acquired by the main comparison result in step S108 can be reset in accordance with a sub comparison result.

The present invention can set the region of interest in the specific part of the surveillance image I, and the region of interest is used to positively choose a sub-feature vector intended to analyze for increasing the identification accuracy of the object identification method. Further, the present invention may set a region of no interest in the specific part of the surveillance image I, and utilize the sub-feature vector outside the region of no interest to increase the identification accuracy of the object identification method. For example, the object identification method may set the region of no interest in the upper part of the surveillance image I, and thus the sub-feature vectors in the upper part of the surveillance image I are excluded, and only the sub-feature vectors in the lower part of the surveillance image I can be used to analyze for adjusting and advancing the identification accuracy.

In the present invention, the surveillance system 10 can continuously gather and store the series of surveillance image I (or the video data) of the surveillance regions A1 and A2 of the cameras 12A and/or 12B, and find out some data relevant to the moving object from the video data in accordance with the cluster distribution feature of the moving object. First, if intending to find the video data related to the first moving object O1, the surveillance system 10 can acquire the first appearing time interval of the first cluster distribution set P1 for a start, and then determine whether the second appearing time interval of the second cluster distribution set P2 and the third appearing time interval of the third cluster distribution set P3 are overlapped with the first appearing time interval of the first cluster distribution set P1. As an example shown in FIG. 3 to FIG. 8, the appearing time interval of the third cluster distribution set P3 overlapped with (completely or partly overlapped) or approached to the appearing time interval of the first cluster distribution set P1 may be found in the series of surveillance images I, and therefore parameters of the foresaid appearing time interval can be applied for preliminary filter to decrease computation quantity.

If the series of surveillance images I still includes other cluster distribution set that has the appearing time interval partly or completely overlapped with the appearing time interval of the first cluster distribution set P1, such as the appearing time intervals of the third cluster distribution set P3 and the fourth cluster distribution set both overlapped with the first appearing time interval (i.e. the fourth moving object and the fourth cluster distribution set are not shown in the figures), the surveillance system 10 can apply the main similarity comparison for the third cluster center of the third cluster distribution set P3 and the first cluster center of the first cluster distribution set P1, and further for the fourth cluster center of the fourth cluster distribution set and the first cluster center of the first cluster distribution set P1, so as to set the similarity ranking of the third cluster distribution set and the fourth cluster distribution set in accordance with the main comparison result. For example, the surveillance image I of the third cluster distribution set P3 acquired at the third specific point of time and the surveillance image I of the fourth cluster distribution set acquired at the fourth specific point of time can be displayed on the screen alongside the surveillance image I of the first cluster distribution set P1 acquired at the first specific point of time; if the similarity ranking of the third cluster distribution set is greater than the similarity ranking of the fourth cluster distribution set, the surveillance image I acquired at the third specific point of time can be arranged just adjacent to the surveillance image I acquired at the first specific point of time, and the surveillance image I acquired at the fourth specific point of time can be arranged next to the surveillance image I acquired at the third specific point of time.

Figure 13:
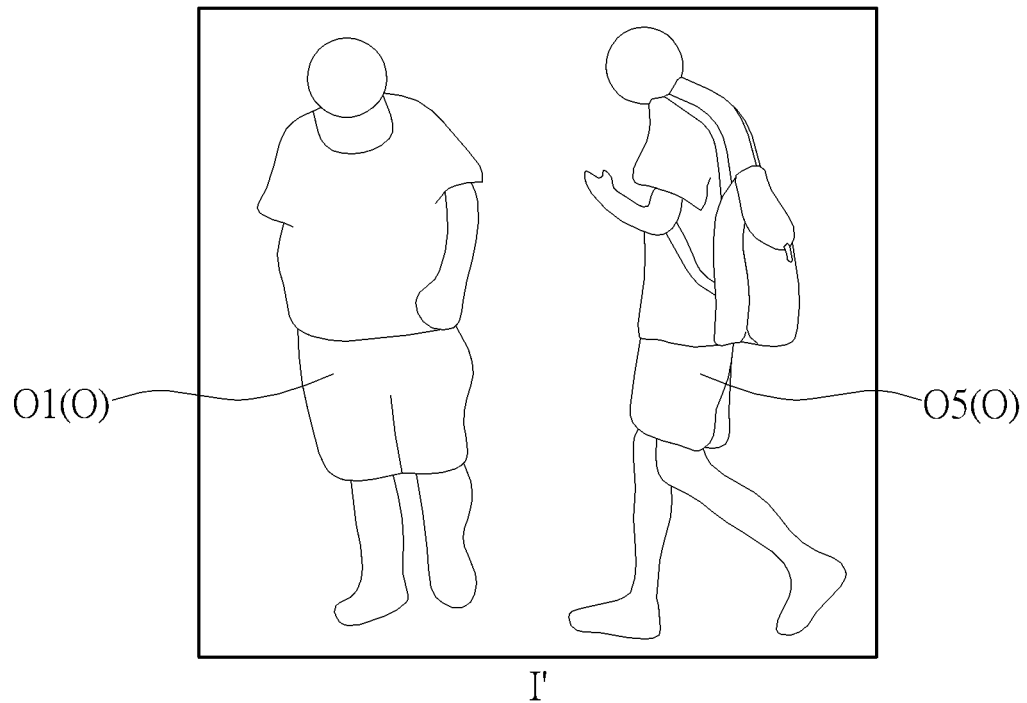
FIG. 13 and FIG. 14 are diagrams of the surveillance image acquired by the surveillance system according to another embodiment of the present invention.
Figure 14:
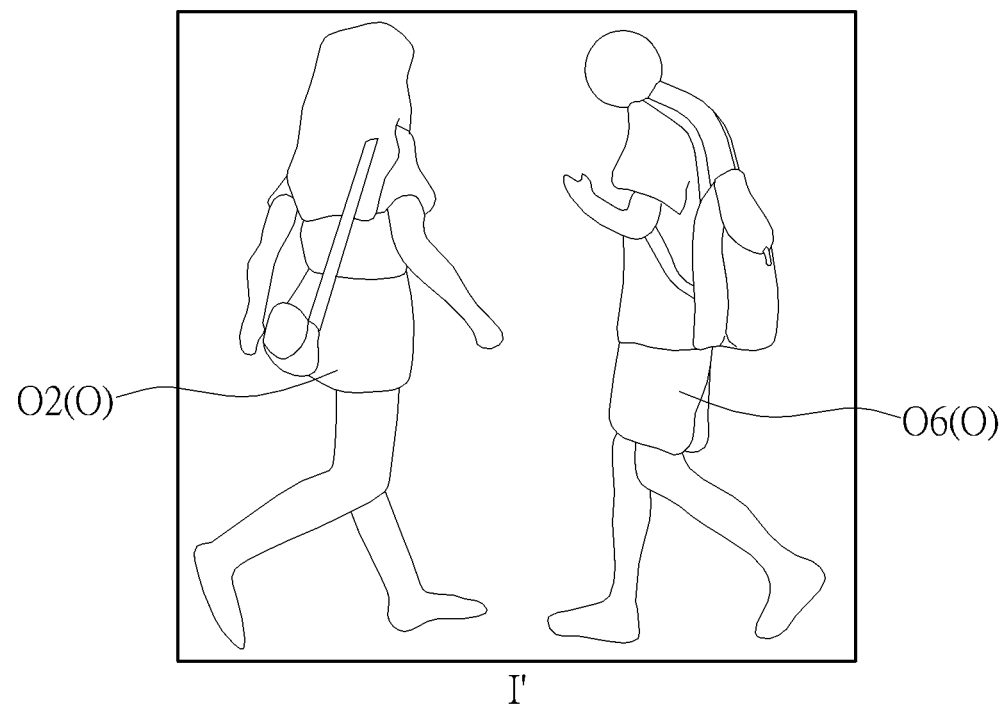

The surveillance images I shown in FIG. 3 to FIG. 8 can be used to identify one moving object within the image, and the present invention can be applied an object identification function for the plurality of moving objects. Please refer to FIG. 13 and FIG. 14. FIG. 13 and FIG. 14 are diagrams of the surveillance image I' acquired by the surveillance system 10 according to another embodiment of the present invention. The object identification method can acquire a fifth cluster distribution set (not shown in the figures) of the fifth moving object O5 adjacent to the first moving object O1 and a sixth cluster distribution set (not shown in the figures) of the sixth moving object O6 adjacent to the second moving object O2 from the series of surveillance images I', and apply the main similarity comparison for the fifth cluster distribution set and the sixth cluster distribution set.

The object identification method can apply the main similarity comparison for the first cluster distribution set, the second cluster distribution set and the sixth cluster distribution set, and then apply another main similarity comparison for the fifth cluster distribution set and one cluster distribution set (such as the sixth cluster distribution set) that has lower sequence in the previous main similarity comparison; According to the two main comparison results, the similarity ranking of an assembly of the first moving object O1 and the fifth moving object O5 and an assembly of the second moving object O2 and the sixth moving object O6 can be set by determining whether the first moving object O1 and the fifth moving object O5 are appeared at the same time, and whether the second moving object O2 and the sixth moving object O6 are appeared at the same time, for an aim of the multiple object identification. Besides, the present invention can execute the multiple object identification in other manners; for example, a combination of the first cluster distribution set and the fifth cluster distribution set can be compared with a combination of the second cluster distribution set and the sixth cluster distribution set, and a sequence result of the multiple object identification can be set in accordance with a foresaid comparison result. Methods of the multiple object identification are not limited to the above-mentioned embodiments, and depend on the design demand.

In conclusion, the object identification method and the surveillance system of the present invention can search several surveillance images that contain each moving object from the video data via the trace data of the moving objects, and find out the feature vectors of the moving object in each surveillance image for generating the cluster distribution set of the moving object. Each of the moving objects in the video data can have the corresponding cluster distribution set. If the surveillance system intends to confirm whether one moving object is appeared in other surveillance period of the video data (which means the surveillance system includes one camera) or appeared in other surveillance regions (which means the surveillance system includes the plurality of cameras), the object identification method can analyze the appearing time interval, the cluster center and the indication point of time of the cluster distribution set of the moving object to compare with the appearing time interval, the cluster center and the indication point of time of other cluster distribution sets, so as to rapidly find out all information related to the moving object from the video data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object identification method applied to a surveillance system, the surveillance system having at least one surveillance apparatus, the object identification method comprising:
   acquiring a plurality of first feature vectors of a first moving object and a plurality of second feature vectors of at least one second moving object within a series of surveillance images from the surveillance apparatus;
   transforming the plurality of first feature vectors into a first cluster distribution set, so as to record a first appearing time interval and a first cluster center of the first cluster distribution set, and a first specific point of time representing the first cluster distribution set;
   transforming the plurality of second feature vectors into at least one second cluster distribution set;
   applying a main similarity comparison to the first cluster distribution set and the at least one second cluster distribution set; and
   setting a similarity ranking of the at least one second cluster distribution set relative to the first cluster distribution set in accordance with a main comparison result, so as to determine whether the first moving object and the at least one second moving object are the same.

2. The object identification method of claim 1, wherein acquiring the plurality of first feature vectors of the first moving object within the series of surveillance images comprises:
   acquiring a first trace datum of the first moving object;
   searching a plurality of surveillance images relevant to the first trace datum from the series of surveillance images; and
   analyzing the plurality of surveillance images to acquire the plurality of first feature vectors.

3. The object identification method of claim 1, wherein acquiring the plurality of first feature vectors of the first moving object within the series of surveillance images comprises:
   dividing each of the series of surveillance images into an alpha area and a beta area in accordance with the first moving object;
   computing a first alpha area sub-feature vector of the first moving object in the alpha area and a first beta area sub-feature vector of the first moving object in the beta area within the surveillance image relevant to a trace datum of the first moving object; and
   combining the first alpha area sub-feature vector and the first beta area sub-feature vector to set as a corresponding first feature vector of the surveillance image.

4. The object identification method of claim 3, wherein each surveillance image is uniformly divided into the alpha area and the beta area in accordance with the first moving object, or a region of interest is set in each surveillance image to be one of the alpha area and the beta area.

5. The object identification method of claim 3, further comprising:
   transforming a plurality of first alpha area sub-feature vectors of the first moving object into a first alpha area cluster distribution set;
   transforming a plurality of second alpha area sub-feature vectors of the at least one second moving object into at least one second alpha area cluster distribution set;

applying a sub similarity comparison for the at least one second alpha area cluster distribution set and the first alpha area cluster distribution set; and
resetting the similarity ranking acquired by the main similarity comparison via a sub comparison result.

6. The object identification method of claim 1, wherein some corresponding first feature vectors relevant to each point of time within the first appearing time interval are acquired, and one of the foresaid corresponding first feature vectors closest to the first cluster center is defined as a specific first feature vector, and a point of time for the specific first feature vector is set as the first specific point of time.

7. The object identification method of claim 1, further comprising:
acquiring a third cluster distribution set of a third moving object and a fourth cluster distribution set of a fourth moving object within the series of surveillance images;
determining appearing time intervals of the third cluster distribution set and the fourth cluster distribution set are overlapped with the first appearing time interval of the first cluster distribution set;
applying the main similarity comparison for the first cluster center and cluster centers of the third cluster distribution set and the fourth cluster distribution set; and
displaying two surveillance image respectively relevant to the third cluster distribution set and the fourth cluster distribution set and acquired at specific points of time alongside a correspond surveillance image relevant to the first cluster distribution set and acquired at the first specific point of time in accordance with the main comparison result.

8. The object identification method of claim 1, further comprising:
acquiring a fifth cluster distribution set of a fifth moving object adjacent to the first moving object and a sixth cluster distribution set of a sixth moving object adjacent to the second moving object within the series of surveillance images;
applying another main similarity comparison for the fifth cluster distribution set and the sixth cluster distribution set; and
setting another similarity ranking of an assembly of the first moving object and the fifth moving object and an assembly of the second moving object and the sixth moving object in accordance with two main comparison results.

9. A surveillance system, comprising:
at least one surveillance apparatus adapted to acquire a series of surveillance images; and
an operation processor electrically connected to the at least one surveillance apparatus in a wire manner or in a wireless manner, the operation processor being adapted to acquire a plurality of first feature vectors of a first moving object and a plurality of second feature vectors of at least one second moving object within the series of surveillance images, to transform the plurality of first feature vectors into a first cluster distribution set for recording a first appearing time interval and a first cluster center of the first cluster distribution set, and a first specific point of time representing the first cluster distribution set, to transform the plurality of second feature vectors into at least one second cluster distribution set, to apply a main similarity comparison to the first cluster distribution set and the at least one second cluster distribution set, and set a similarity ranking of the at least one second cluster distribution set relative to the first cluster distribution set in accordance with a main comparison result, so as to determine whether the first moving object and the at least one second moving object are the same.

10. The surveillance system of claim 9, wherein the operation processor is further adapted to acquire a first trace datum of the first moving object, to search a plurality of surveillance images relevant to the first trace datum from the series of surveillance images, and to analyze the plurality of surveillance images to acquire the plurality of first feature vectors.

11. The surveillance system of claim 9, wherein the operation processor is further adapted to divide each of the series of surveillance images into an alpha area and a beta area in accordance with the first moving object, to compute a first alpha area sub-feature vector of the first moving object in the alpha area and a first beta area sub-feature vector of the first moving object in the beta area within the surveillance image relevant to a trace datum of the first moving object, and to combine the first alpha area sub-feature vector and the first beta area sub-feature vector to set as a corresponding first feature vector of the surveillance image.

12. The surveillance system of claim 11, wherein each surveillance image is uniformly divided into the alpha area and the beta area in accordance with the first moving object, or a region of interest is set in each surveillance image to be one of the alpha area and the beta area.

13. The surveillance system of claim 11, wherein the operation processor is further adapted to transform a plurality of first alpha area sub-feature vectors of the first moving object into a first alpha area cluster distribution set, to transform a plurality of second alpha area sub-feature vectors of the at least one second moving object into at least one second alpha area cluster distribution set, to apply a sub similarity comparison for the at least one second alpha area cluster distribution set and the first alpha area cluster distribution set, and to reset the similarity ranking acquired by the main similarity comparison via a sub comparison result.

14. The surveillance system of claim 9, wherein some corresponding first feature vectors relevant to each point of time within the first appearing time interval are acquired, and one of the foresaid corresponding first feature vectors closest to the first cluster center is defined as a specific first feature vector, and a point of time for the specific first feature vector is set as the first specific point of time.

15. The surveillance system of claim 9, wherein the operation processor is further adapted to acquire a third cluster distribution set of a third moving object and a fourth cluster distribution set of a fourth moving object within the series of surveillance images, to determine appearing time intervals of the third cluster distribution set and the fourth cluster distribution set are overlapped with the first appearing time interval of the first cluster distribution set, to apply the main similarity comparison for the first cluster center and cluster centers of the third cluster distribution set and the fourth cluster distribution set, and display two surveillance image respectively relevant to the third cluster distribution set and the fourth cluster distribution set and acquired at specific points of time alongside a correspond surveillance image relevant to the first cluster distribution set and acquired at the first specific point of time in accordance with the main comparison result.

16. The object identification method of claim 9, wherein the operation processor is further adapted to acquire a fifth cluster distribution set of a fifth moving object adjacent to the first moving object and a sixth cluster distribution set of a sixth moving object adjacent to the second moving object within the series of surveillance images, to apply another main similarity comparison for the fifth cluster distribution set and the sixth cluster distribution set, and to set another similarity ranking of an assembly of the first moving object and the fifth moving object and an assembly of the second moving object and the sixth moving object in accordance with two main comparison results.

* * * * *